(12) United States Patent
Zhang et al.

(10) Patent No.: US 11,024,175 B2
(45) Date of Patent: Jun. 1, 2021

(54) ADAPTIVE VEHICLE-INFRASTRUCTURE COMMUNICATIONS

(71) Applicant: Ford Global Technologies, LLC, Dearborn, MI (US)

(72) Inventors: Linjun Zhang, Canton, MI (US); Helen Elizabeth Kourous-Harrigan, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 16/162,946

(22) Filed: Oct. 17, 2018

(65) Prior Publication Data

US 2020/0126421 A1 Apr. 23, 2020

(51) Int. Cl.
| | |
|---|---|
| G08G 1/16 | (2006.01) |
| G08G 1/0967 | (2006.01) |
| G05D 1/00 | (2006.01) |
| G05D 1/02 | (2020.01) |
| H04W 4/44 | (2018.01) |

(52) U.S. Cl.
CPC .......... G08G 1/164 (2013.01); G05D 1/0088 (2013.01); G05D 1/0285 (2013.01); G08G 1/096783 (2013.01); G08G 1/166 (2013.01); H04W 4/44 (2018.02); G05D 2201/0213 (2013.01)

(58) Field of Classification Search
CPC .. G08G 1/164; G08G 1/166; G08G 1/096783; G08G 1/096708; G08G 1/165; G08G 1/167; G05D 1/0088; G05D 1/0285; G05D 2201/0213; G05D 1/028; H04W 4/44
See application file for complete search history.

(56) References Cited

U.S. PATENT DOCUMENTS

| | | | |
|---|---|---|---|
| 8,046,162 B2 | 10/2011 | Nonaka | |
| 8,923,147 B2 | 12/2014 | Krishnaswamy et al. | |
| 9,580,014 B2 * | 2/2017 | Lucas | ................ G06K 9/00805 |
| 2016/0144853 A1 * | 5/2016 | Stenneth | .......... G08G 1/096758 701/1 |
| 2016/0360524 A1 | 12/2016 | Blasco Serrano et al. | |
| 2017/0371608 A1 * | 12/2017 | Wasserman | ............... G06F 3/14 |
| 2018/0090008 A1 | 3/2018 | Ikenouchi et al. | |
| 2018/0261020 A1 * | 9/2018 | Petousis | .................. H04W 4/44 |

FOREIGN PATENT DOCUMENTS

| | | |
|---|---|---|
| JP | 3832345 B2 | 7/2003 |
| JP | 4935998 B2 | 11/2008 |

OTHER PUBLICATIONS

Woo, et. al., "Performance Analysis for Priority-Based Broadcast in Vehicular Networks", Hindawi Publishing Corporation, International Journal of Distributed Sensor Networks, vol. 2013, Article ID 734637, retrieved from Internet URL: http://dx.doi.org/10.1155/2013/734637 (9 pages).

* cited by examiner

Primary Examiner — Michael V Kerrigan
(74) Attorney, Agent, or Firm — Frank A. MacKenzie; Bejin Bieneman PLC (57) ABSTRACT

Respective priorities are assigned to data about each of a plurality of objects based on a collision severity and a classification of each of the objects. A message is generated including at least some of the data ordered according to the priorities.

20 Claims, 4 Drawing Sheets

ADAPTIVE VEHICLE-INFRASTRUCTURE COMMUNICATIONS

BACKGROUND

Vehicle-to-infrastructure (V2I) communications can allow an infrastructure element installed proximate to a road to provide data to vehicles in an area proximate to the infrastructure element. For example, the infrastructure element may be able to provide data about objects, hazards, etc., in the area to support a vehicle's path planning, e.g., avoidance of hazards and objects. However, the infrastructure element may have limited bandwidth and/or a limited payload per packet in which to transmit data to vehicles.

DETAILED DESCRIPTION

Introduction

A system, comprises a computer including a processor and a memory, the memory storing instructions executable by the processor to assign respective priorities to data about each of a plurality of objects based on a collision severity and a classification of each of the objects; and generate a message including at least some of the data ordered according to the priorities. The instructions can further comprise instructions to, prior assigning the priorities and generating the message, determine that an aggregate size of the data exceeds a maximum payload of the message. The instructions to assign the respective priorities can further include instructions to first initialize the priorities according to an object classification and then to adjust the priorities based on the collision severity or the classification of the respective object. The instructions to assign the respective priorities can further include instructions to adjust the priority of a first object based on a sensor blind spot of a second object. The instructions to assign the respective priorities can further include instructions to adjust the priority of an object for which data was omitted in a prior message. The instructions to assign the respective priorities can further include instructions to adjust the priority of an object within a specified distance of an intersection or a curve. The instructions can further comprise instructions to generate a second message including data that was omitted from the message according to the priorities. The system can further comprise a stationary infrastructure element, wherein the computer is mounted to the stationary infrastructure element. The system can further comprise a vehicle, wherein the computer is included in the vehicle. The system can further comprise a lidar sensor, wherein the instructions further include instructions to receive data from the LIDAR sensor.

A method, comprises assigning respective priorities to data about each of a plurality of objects based on a collision severity and a classification of each of the objects; and generating a digital message including at least some of the data ordered according to the priorities. The method can further comprise, prior assigning the priorities and generating the message, determining that an aggregate size of the data exceeds a maximum payload of the message. Assigning the respective priorities can further comprise first initializing the priorities according to an object classification and then adjusting the priorities based on the collision severity or the classification of the respective object. Adjusting the respective priorities can further comprise adjusting the priority of a first object based on a sensor blind spot of a second object. Adjusting the respective priorities can further comprise adjusting the priority of an object for which data was omitted in a prior message. Adjusting the respective priorities can further comprise adjusting the priority of an object within a specified distance of an intersection or a curve. The method can further comprise generating a second message including data that was omitted from the message according to the priorities. The message can be sent from a computer mounted to a stationary infrastructure element. The message can be sent from a computer included in a vehicle. The data can be received from a LIDAR sensor.

Exemplary System Elements

Figure 1:
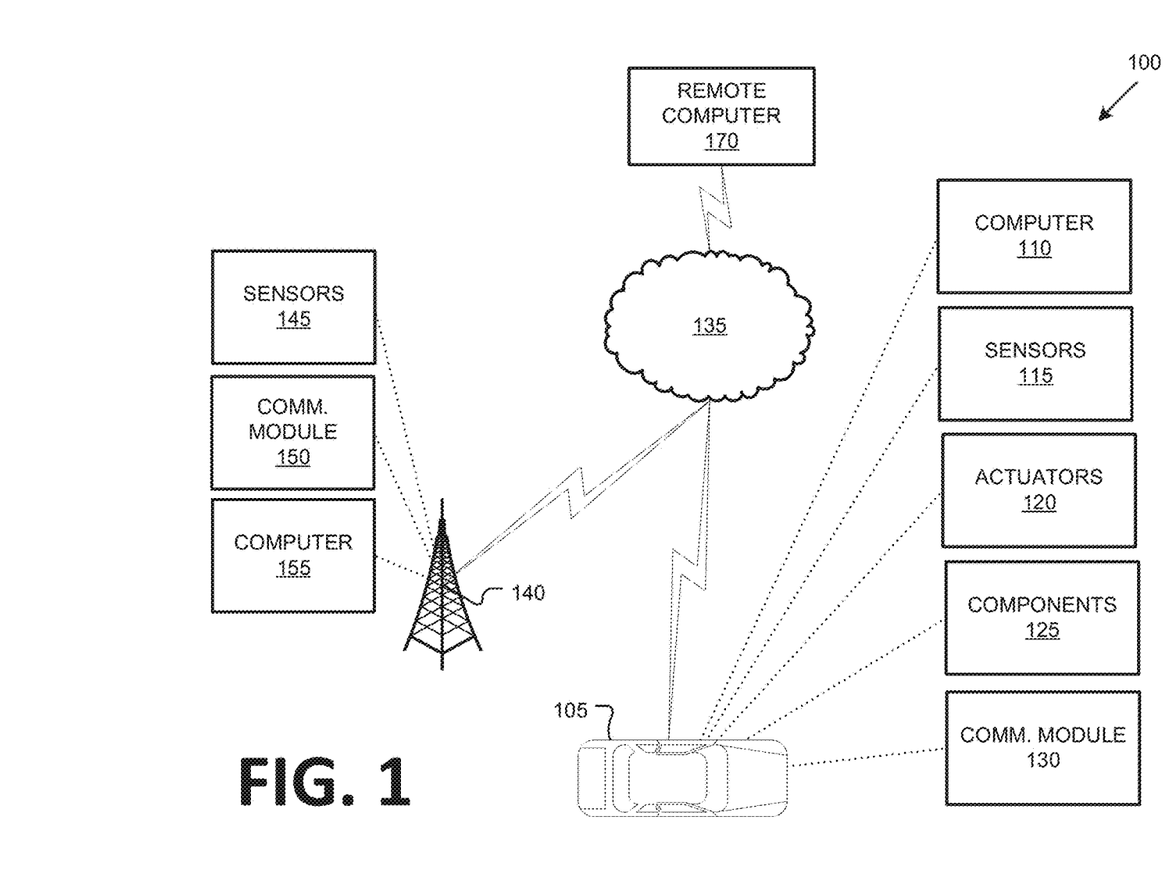
FIG. 1 is a diagram illustrating an example infrastructure communications and control system.

FIG. 1 is a block diagram of an example infrastructure communications and control system (or infrastructure system) 100. An infrastructure element 140 can include a computer 155 programmed to generate an area map, i.e., a map that specifies objects, and typically their respective locations and classifications, in an area proximate to the infrastructure element 140. The computer 155 can transmit the area map via a communications module 150 to one or more vehicles 105 in the area proximate to the infrastructure element 140. Transmission of a packetized message including the area map can consume significant bandwidth. Advantageously, when data about one or more objects is to be transmitted, and the data cannot be provided in a single message payload, the computer 155 can prioritize data about respective objects to provide data about higher priority objects before data about objects with relatively lower priority(ies.) Thus, if object data will not fit into a single message, a first message may include data about higher priority objects than objects about which data is provided in second message. The computer 155 can thus provide timely and accurate information to promote safe and efficient vehicle 105 operation while at the same time making efficient use of available bandwidth.

The system 100 an infrastructure element 140 that can provide data to one or more vehicles 105, typically (but not necessarily) a land vehicle such as a car, truck, etc. Additionally or alternatively, a vehicle 105 may include a bicycle, a motorcycle, etc. A vehicle 105 includes a vehicle computer 110, sensors 115, actuators 120 to actuate various vehicle components 125, and a vehicle communications module 130. Via a network 135, the communications module 130 allows the vehicle computer 110 to communicate with one or more infrastructure elements 140 and a central server 170.

A vehicle computer 110 includes a processor and a memory such as are known. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 105 network such as a communications bus as described further below, more than one processor, e.g., included in electronic controller units (ECUs) or the like included in the vehicle for monitoring and/or controlling various vehicle components 125, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 105 network, the computer 110 may transmit messages to various devices in the vehicle and/or receive messages (e.g., CAN messages) from the various devices, e.g., sensors 115, an actuator 120, an human machine interface (HMI), etc. Alternatively or additionally, in cases where the computer 110 actually comprises a plurality of devices, the vehicle 105 communication network may be used for communications between devices represented as the computer 110 in this disclosure. Further, as mentioned below, various controllers and/or sensors 115 may provide data to the computer 110 via the vehicle communication network.

Vehicle 105 sensors 115 may include a variety of devices such as are known to provide data to the computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be detected by sensing physical phenomena (e.g., light or other electromagnetic waves, or sound, etc.), e.g., phenomena detectable by sensors 115. An object can be moving (speed≠0) or temporarily or permanently stationary (speed=0). Thus, vehicles 105, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 101, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2I) wireless communications to another vehicle, to an infrastructure element 140 (typically via direct radio frequency communications) and/or (typically via the network 135) a remote server 170. The module 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 105 may communicate with an infrastructure element 140 and/or central server 170. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

An infrastructure element 140 includes a physical structure such as a tower or other support structure (e.g., a pole, a box mountable to a bridge support, cell phone tower, road sign support, etc.) on or in which infrastructure sensors 145, as well as an infrastructure communications module 150 and computer 155 can be housed, mounted, stored, and/or contained, and powered, etc. One infrastructure element 140 is shown in FIG. 1 for ease of illustration, but the system 100 could and likely would include tens, hundreds, or thousands of elements 140.

An infrastructure element 140 is typically stationary, i.e., fixed to and not able to move from a specific physical location. The infrastructure sensors 145 may include one or more sensors such as described above for the vehicle 105 sensors 115, e.g., LIDAR, radar, cameras, ultrasonic sensors, etc. The infrastructure sensors 145 are fixed or stationary.

That is, each sensor 145 is mounted to the infrastructure element so as to have a substantially unmoving and unchanging field of view.

Sensors 145 thus provide field of views in contrast to vehicle 105 sensors 115 in a number of advantageous respects. First, because sensors 145 have a substantially constant field of view, determinations of vehicle 105 and object locations can be accomplished with fewer and simpler processing resources than if movement of the sensors 145 also had to be accounted for. Further, the sensors 145 include an external perspective of the vehicle 145 and can sometimes detect features and characteristics of objects not in the vehicle 105 sensors 115 field(s) of view and/or can provide more accurate detection, e.g., with respect to vehicle 105 location and/or movement with respect to other objects. Yet further, sensors 145 can communicate with the element 140 computer 155 via a wired connection, whereas vehicles 105 typically can communicates with elements 140 and/or a server 170 only wirelessly, or only at very limited times when a wired connection is available. Wired communications are more reliable and can be faster than wireless communications such as vehicle-to-infrastructure communications or the like.

The communications module 150 and computer 155 typically have features in common with the vehicle computer 110 and vehicle communications module 130, and therefore will not be described further to avoid redundancy. Although not shown for ease of illustration, the infrastructure element 140 also includes a power source such as a battery, solar power cells, and/or a connection to a power grid.

The server 170 can be a conventional computing device, i.e., including one or more processors and one or more memories, programmed to provide operations such as disclosed herein. Further, the server 170 can be accessed via the network 135, e.g., the Internet or some other wide area network.

Figure 2:
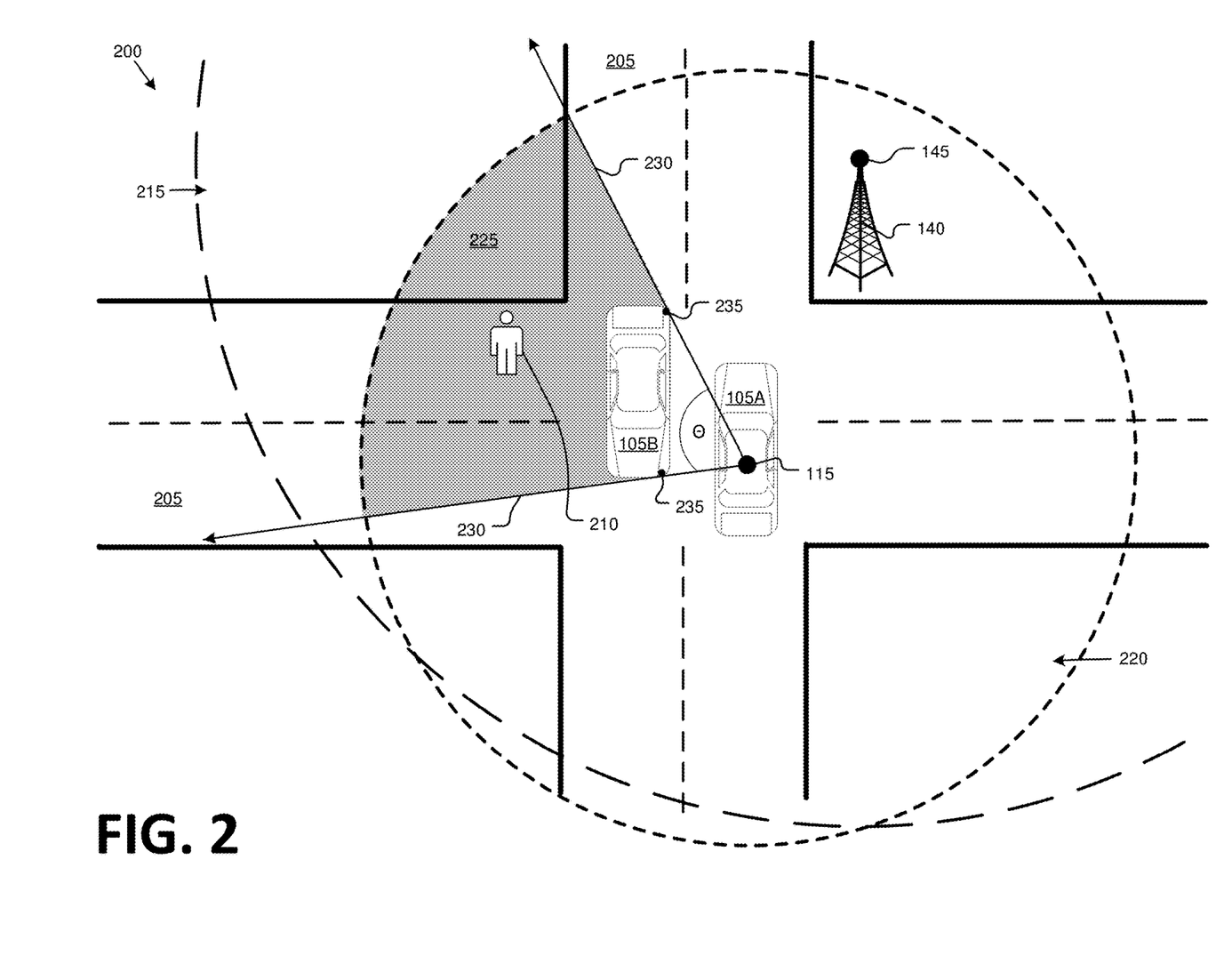
FIG. 2 is a block diagram illustrating an example area proximate to an infrastructure element.

Turning to FIG. 2, an infrastructure element 140 can be provided to monitor an area 200 around the infrastructure element 140, including vehicles 105A, 105B on road(s) 205, as well as other objects on a road 205, such as a pedestrian 210. A sensor 145 mounted to the infrastructure element, e.g., a lidar, can have a field of view 215, from which the sensor 145 can provide data about various objects, e.g., vehicles 105A, 105B, pedestrian 210, etc. Moreover, a vehicle 105A sensor 115 has a field of view 220, including a blind spot 225 due to occlusion or blockage by the vehicle 105B/Although only vehicles 105A, 105B and a pedestrian object 210 are illustrated in FIG. 2, an area 200 could, and very often will, include other vehicles 105, such as emergency vehicles, passenger cars or trucks, cargo vans or trucks, bicycles, motorcycles, etc. and/or other moving and/or stationary objects, e.g., debris, road signs, construction barriers, etc.

The computer 155 can receive various data from the infrastructure element 140 sensors 145 to generate an area map. Such data can include LIDAR data from within a sensor 145 field of view 215 that includes conventional LIDAR point cloud data acquired by LIDARsensors 145, i.e., including data describing points in three dimensions. Various techniques are known for identifying hazards or objects and/or determining characteristics of hazards and/or objects, such as a height, a width, identification of an object (e.g., bicycle, pedestrian, speedbump, pothole, etc.), etc. A map of an area 200, or portion thereof within a sensor 115, 145 field of view 220, 215 can be rendered in a variety of ways. In an example used herein, the area map specifies, e.g., according to a Cartesian coordinate system or the like, e.g., global positioning system latitude and longitude coordinates, respective locations of objects such as vehicles 105, a pedestrian 210, as well as locations or an area of a blind spot 225.

A blind spot 225 can be determined according to principles of Euclidean geometry. For example, vehicle computer 110 could identify, from sensor data 115, sightlines 230 through edge or corner points 235 on an object such as, in the example of FIG. 2, a vehicle 105B. Moreover, sensor 115 data can be used to determine a distance between the respective points 235, as well as respective distances from each of the points 235 to the sensor 115 on the vehicle 105A. Moreover, basic trigonometry allows determination of an angle θ between the sightlines 230. Further, based on current respective locations and a relative velocity of vehicles 105A, 105B, i.e., relative to one another, a blind spot 225 can be predicted for a future time. Yet further, an infrastructure computer 155, e.g., based on data from an infrastructure sensor 145, can likewise determine a location of a vehicle 105A sensor relative to corner points 235 on a second vehicle 105B, and can thereby determine a blind spot 225 as just described.

Table 1 provides an example of data that a computer 110, 155 could generate about a detected object from sensor 115, 145 data.

| Field | Definition |
| --- | --- |
| ID | Object identifier, e.g., generated randomly, sequentially, etc. |
| Location | Object location or area, e.g., according to one or more cartesian coordinate pairs, e.g., geo-coordinates and/or coordinates with the element 140 as an origin. |
| Heading | Object heading (NULL if object has not been detected to move within a specified time, e.g., last minute). |
| Velocity | Object velocity (0 if stationary). |
| Dimensions | Typically length, width, height, e.g., as can be determined from liar point cloud data. |
| Timestamp | Time object data was collected. |
| Type | Object classification or type, i.e., category of object such as pedestrian, bicyclist, vehicle, animal, pothole, road construction barrier, etc. |
| Detection/classification confidence | A score, typically on a scale of 0 to 100 percent, such as can be output from a deep neural network or the like according to various techniques, of a confidence in detection and/or classification of an object. |
| Projected trajectory | E.g., as determined by a Kalman filter, particle filter, or the like according to known techniques, specifying locations of an object at respective times. |
| Blind spots | Identifiers of other objects in whose blind spots 225 the current object (i.e., specified in the ID field mentioned above) is located. |

The computer 155 can be programmed to serialize, i.e., convert to a string of bits, area map data and data about objects such as shown in Table 1. The foregoing object data may, for each object, consume approximately 100 bytes. Protocols such as DSRC (Dedicated Short Range Communications) may thus allow inclusion of data for approximately 12 objects in a single message packet. However, in many vehicle operating environments, e.g., urban environments, a number of objects being tracked can be well over 12 objects. Some objects can have a higher latency, i.e., require a slower response, then other objects.

Figure 3:
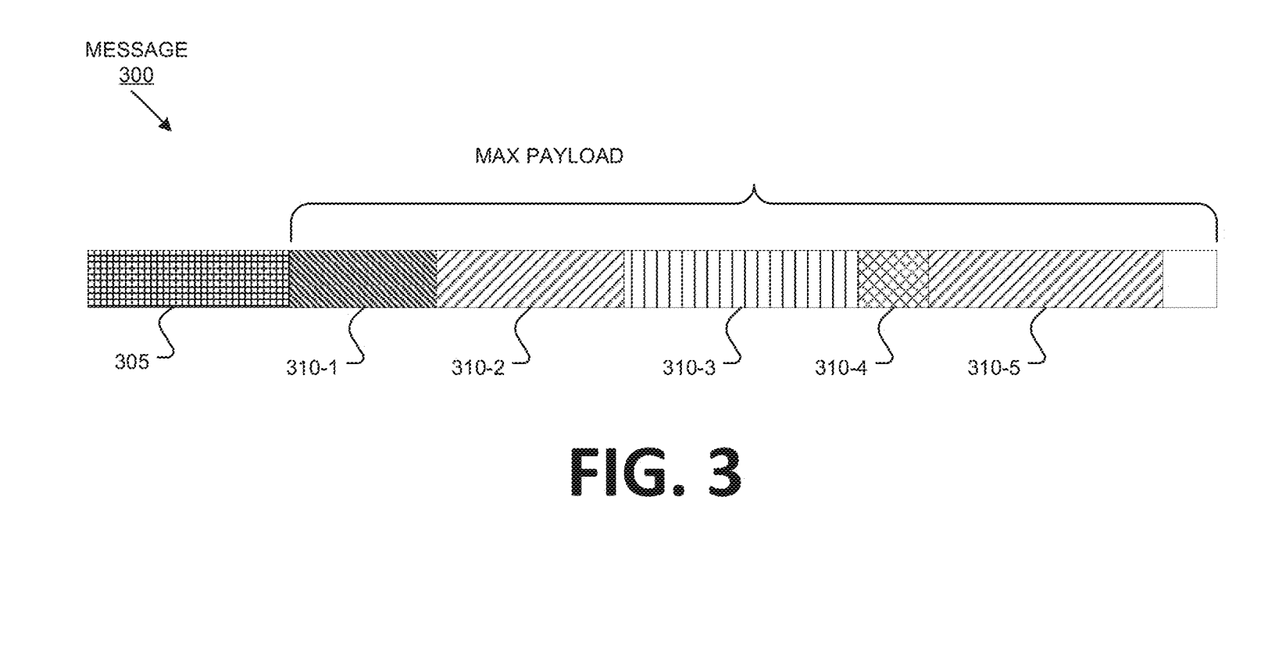
FIG. 3 is a block diagram illustrating an example infrastructure message.

FIG. 3 is a block diagram illustrating a message 300, i.e., a packet including a header 305 and a payload that includes sub-payloads or payload segments 310-1, 310-2, 310-3, 310-4, 310-5 (collectively, referred to as a payload segments 310). Each payload segment 310 can include object data, e.g., as illustrated in Table 1. The header 305 can include fields as set forth in Table 2:

| Field | Definition |
| --- | --- |
| Certificate | A series of bytes that can be used to identify whether a message is broadcast by certified devices, e.g., according to conventional certificate techniques. |
| MessageID | Identifier for the message (typically randomly generated) |
| MessageType | Description of payload, e.g., hazard map, occupancy boxes, emergency broadcast, traffic signal notification, etc. |
| RegionSpecifier | A set of coordinate on a map specifying an occupancy box, i.e., an area to be indicated as occupied by an object. The occupancy box is typically rectangular and therefor theRegionSpecifier typically includes coordinates for corners of the rectangle, e.g., UpperRight, UpperLeft, LowerRight, LowerLeft. Could be NULL if no occupancy boxes are being provided in the message. |
| Number n of packets in the message | Total number of packets in the message to provide the payload S |
| Current packet index i | Index of the current packet |
| k | Total number of bytes needed for the message payload |
| Current payload | Size (in bytes) of the current packet payload |

The respective payload segments 310 in FIG. 3 are illustrated as being of different lengths to reflect that a computer 155 may generate varying amounts of data for different objects, and therefore different payload segments may be of different sizes. Further, because a payload segment typically cannot be split across two or more packets 300, the total size of the segments 310 may be less than a maximum payload of the message 300, but in any event, the total size of the segments 310 cannot be more than the maximum payload.

Figure 4:
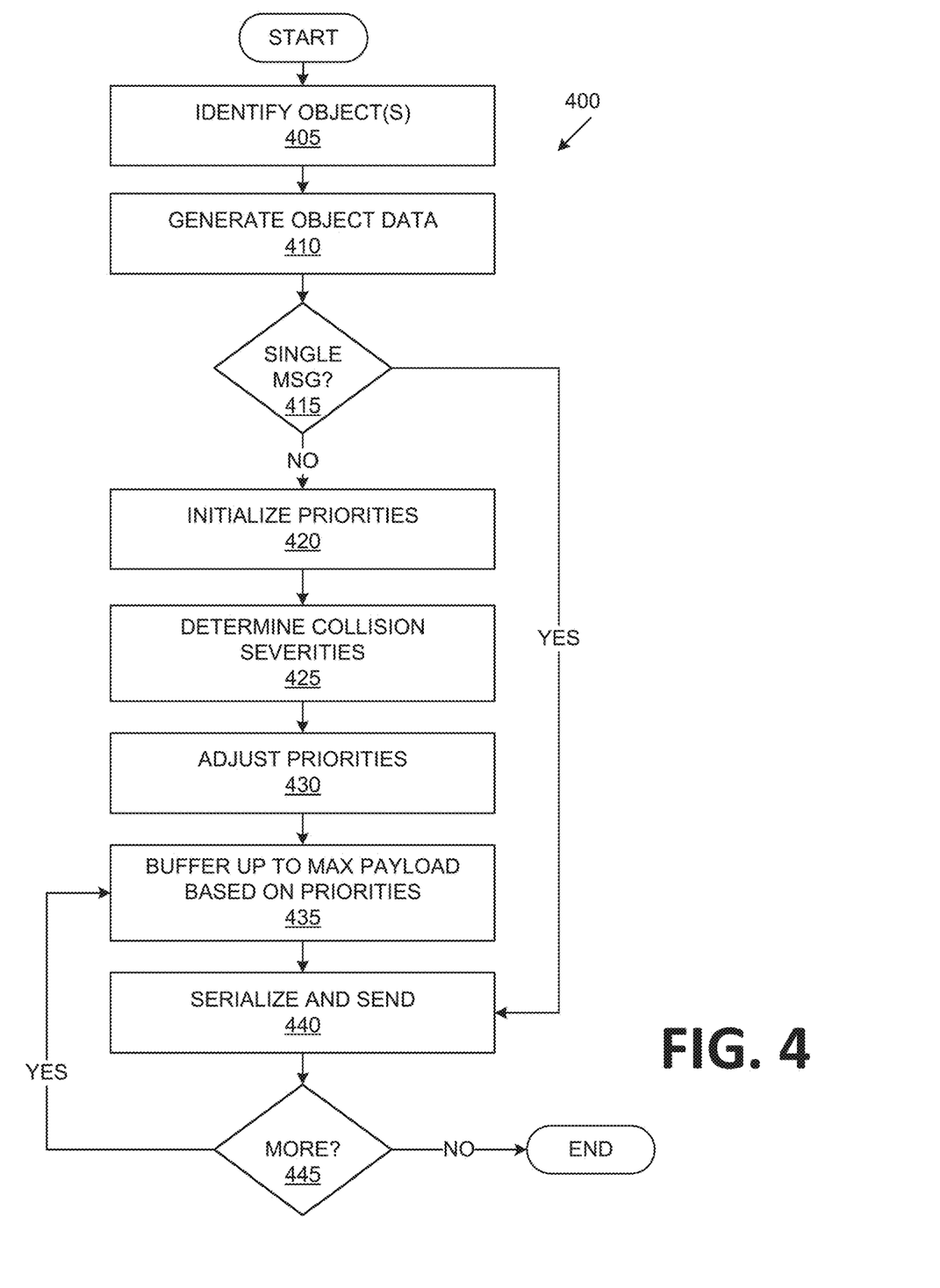
FIG. 4 is a flowchart of an exemplary process to generate and send one or more infrastructure messages.

FIG. 4 is a flowchart of an exemplary process 400 to generate a message 300. As described below, the process 400 can be executed by a processor of a computer 155 according to instructions stored in a memory of the computer 155. Alternatively or additionally, a vehicle 105 computer 110 could execute the process 400 to provide a message or messages 300 to other vehicles 105.

The process 400 can begin in a block 405, in which the computer 155 receives sensor 145 data and identifies one or more objects.

Next, in a block 410, the computer 155 determines respective trajectories, including locations, and blind spots 225 of objects identified in the block 405.

Next, in a decision block 415, the computer 155 determines whether information about each of the objects identified in the block 405 can be included in a single packet 300, or whether an aggregate size of the data for all of the objects together, e.g., respective payload segments 310 for each object, are larger than a maximum packet 300 payload size. If only a single packet is required for all objects, then the process 400 proceeds to a block 440. Otherwise, the process 400 proceeds to a block 425.

In the block 420, the computer 155 assigns an initial priority to each of the objects identified in the block 405. Typically the priority is assigned according to a numeric scale. For example, the priority could be assigned on a scale of 1 to 5, priority 1 being the lowest priority and priority 5 being the highest priority. In one example, an object recognized as an on-duty emergency vehicle, e.g., a police car, ambulance, fire truck, etc., is assigned an initial priority of 5, other vehicles are assigned an initial priority of 1, and objects classified as vulnerable users, e.g., bicycles and pedestrians, are assigned an initial priority of 2.

Next, in a block 425, the computer 155 determines, for each detected object, a collision severity, e.g., on a scale of 0 to 100. For example, a Monte Carlo simulation could be executed in which predicted future motion of each object is analyzed over a period of time, e.g., five seconds, ten seconds, etc., to determine a possible collision severity. The Monte Carlo simulation with predicted future motions of objects is possible because object locations and trajectories have been determined as described above. If an object is not involved in a collision in a Monte Carlo simulation run, then it is assigned a collision severity of zero. Otherwise, the object is assigned a collision severity proportional to the square of the relative velocity of the object and a second object with which it collides.

Next, in a block 430, the computer 155 adjusts the initial priorities assigned in the block 420. Such adjustments are typically based on whether an object is in a blind spot of another, moving, object, collision severities, relative object locations, etc. For example, the following rules could govern adjusting priorities.

1. If a collision involving a first object in a second object could occur within a specified time threshold, e.g., five seconds, and the objects are in each other's blind spots 225, then each object's priority is increased by 2, 3, or 4, depending on a predicted time-to-collide. That is, if a collision is imminent, e.g., could occur within one second or less, a priority 4 could be assigned, whereas if a collision is less imminent, then a priority 2 could be assigned.
2. For objects classified as vulnerable, e.g., pedestrians and bicyclists, a priority could be increased by 2 if the object is detected outside of a designated lane or area, e.g., a bicycle lane or sidewalk.

3. If an object is classified as an animal, e.g., a dog, cat, etc., a priority could be increased by 3.
4. If an object is within a specified distance of an intersection or a curve, e.g., five meters, it's priority could be increased by 2.
5. If information about an object was not broadcast in a most recent message 300 or set of messages 300, then it's priority could be increased by 1. This role advantageously promotes the most urgent safety-critical information being broadcast while objects presenting less urgency for safe path planning do not consume limited bandwidth for messages 300.

Following the block 430, next, in a block 435, respective segments 310 for the objects identified in the block 405 are placed into a buffer or data structure included in the computer 155 according to priorities determined as described with respect to the block 420, 430, until a maximum payload of a message 300 is reached, or until a maximum payload of a message 300 would be exceeded by adding a further segment 310. As noted above, a messaging protocol such as DSRC may specify a maximum payload. Within objects having a same priority level, an order can be randomly determined.

Next, in a block 440, the computer 155 serializes and sends the message 300 assembled in the block 435.

Next, in a block 445, the computer 155 determines whether additional segments 310 remain for transmission in a message 300. If yes, the process 400 returns to the block 435. Otherwise, the process 400 ends. Although not illustrated in FIG. 4, it is also possible that the process 400 could be interrupted, e.g., because the computer 155 has identified further high-priority objects warranting a broadcast of data before messages 300 including all objects identified in the block 405 have been broadcast. Similarly, the computer 155 could be programmed, upon performing multiple iterations of the process 400, to include only objects of a specified priority or higher, e.g., 3 or higher on a scale of 1 to 5, in every iteration, and to include objects of lower priorities, e.g., 1 or 2, only in certain iterations, e.g., every other iteration. Thus, rule number 5 for assigning and adjusting priorities discussed above can be important to ensure both that data about highest priority objects are transmitted most often, but also that data about all objects is transmitted on at least some periodic or intermittent basis.

Once the message generated and sent in the process 400 is received by a vehicle 105, a vehicle computer 110 can use the data therein for operation. For example, the computer 110 could actuate one or more components 125, e.g., brakes, steering or propulsion, to avoid a collision, to complete a turn where no objects are indicated in a blind spot 225, to pull to a roadside to allow an emergency vehicle to pass, etc.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

"Based on" encompasses "based wholly or partly on."

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a non-transitory memory, the non-transitory memory storing instructions executable by the processor to cause the processor to:
   perform a simulation of predicted motion of each of a plurality of objects identified from sensor data;
   determine, for one or more of the objects, that the simulation predicts a collision of the one or more objects with a vehicle;
   determine a respective collision severity for each of the objects identified from the sensor data, wherein the collision severity is zero for any object for which a collision was not predicted in the simulation, and is non-zero for the one or more objects for which a collision was predicted;
   assign respective priorities to data about each of the plurality of objects based on the collision severity and a classification of each of the objects; and
   generate a message including at least some of the data ordered according to the priorities.

2. The system of claim 1, wherein the instructions further include instructions to, prior to assigning the priorities and generating the message, determine that an aggregate size of the data exceeds a maximum payload of the message.

3. The system of claim 1, wherein the instructions to assign the respective priorities further include instructions to first initialize the priorities according to an object classification and then to adjust the priorities based on the collision severity or the classification of the respective object.

4. The system of claim 3, wherein the instructions to adjust the respective priorities further include instructions to adjust the priority of a first object based on a sensor blind spot of a second object.

5. The system of claim 3, wherein the instructions to adjust the respective priorities further include instructions to adjust the priority of an object for which data was omitted in a prior message.

6. The system of claim 3, wherein the instructions to adjust the respective priorities further include instructions to adjust the priority of an object within a specified distance of an intersection or a road curve.

7. The system of claim 1, wherein the instructions further include instructions to generate a second message including data that was omitted from the message according to the priorities.

8. The system of claim 1, further comprising a stationary infrastructure element, wherein the computer is mounted to the stationary infrastructure element.

9. The system of claim 1, further comprising a vehicle, wherein the computer is included in the vehicle.

10. The system of claim 1, further comprising a LIDAR sensor, wherein the instructions further include instructions to receive data from the LIDAR sensor.

11. A method, comprising:
    performing a simulation of predicted motion of each of a plurality of objects identified from sensor data;
    determining, for one or more of the objects, that the simulation predicts a collision of the one or more objects with a vehicle;
    determining a respective collision severity for each of the objects identified from the sensor data, wherein the collision severity is zero for any object for which a collision was not predicted in the simulation, and is non-zero for the one or more objects for which a collision was predicted;
    assigning respective priorities to data about each of the plurality of objects based on the collision severity and a classification of each of the objects; and
    generating a digital message including at least some of the data ordered according to the priorities.

12. The method of claim 11, further comprising, prior to assigning the priorities and generating the message, determining that an aggregate size of the data exceeds a maximum payload of the message.

13. The method of claim 11, wherein assigning the respective priorities further comprises first initializing the priorities according to an object classification and then adjusting the priorities based on the collision severity or the classification of the respective object.

14. The method of claim 13, wherein adjusting the respective priorities further comprises adjusting the priority of a first object based on a sensor blind spot of a second object.

15. The method of claim 13, wherein adjusting the respective priorities further comprises adjusting the priority of an object for which data was omitted in a prior message.

16. The method of claim 13, wherein adjusting the respective priorities further comprises adjusting the priority of an object within a specified distance of an intersection or a road curve.

17. The method of claim 11, further comprising generating a second message including data that was omitted from the message according to the priorities.

18. The method of claim 11, wherein the message is sent from a computer mounted to a stationary infrastructure element.

19. The method of claim 11, wherein the message is sent from a computer included in a vehicle.

20. The method of claim 11, further comprising receiving data from a LIDAR sensor.

* * * * *